W. Harsen,
Stuffing-Box.

No. 59,837. Patented Nov. 20, 1866.

Witnesses:
J. W. Coomly
G. W. Reed

Inventor:
W. Harsen

United States Patent Office.

IMPROVEMENT IN STUFFING-BOXES.

WILLIAM HARSEN, OF GREENPOINT, NEW YORK.

Letters Patent No. 59,837, dated November 20, 1866.

SPECIFICATION.

TO ALL WHOM IT MAY CONCERN:

Be it known that I, WILLIAM HARSEN, of Greenpoint, in the county of Kings, and State of New York, have invented a certain new and useful Improvement in Stuffing-Boxes, of which the following is a full, clear, and exact description, reference being had to the accompanying drawing forming part of this specification, and in which—

Figure 1:
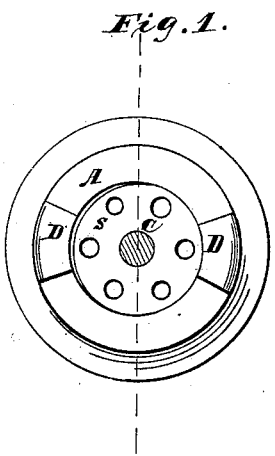

Figure 1 represents a plan view of a stuffing-box, in connection with certain details or accompanying parts, and constructed according to my improvement.

Figure 2:
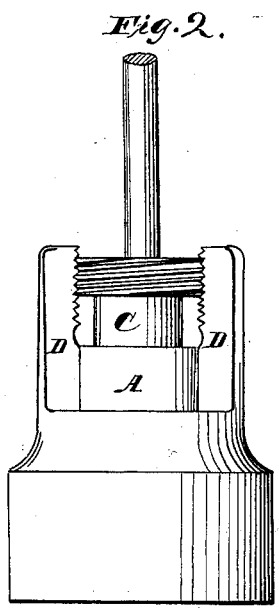

Figure 2, a side elevation of the same; and

Figure 3:
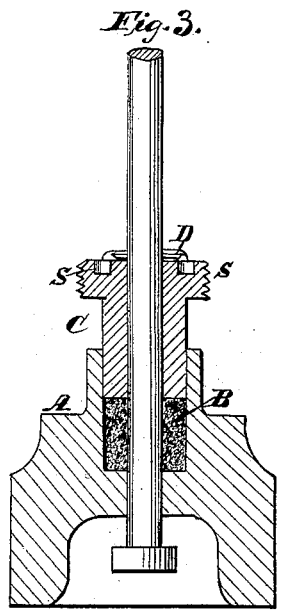

Figure 3, a transverse section taken as indicated by the line $x\ x$, in fig. 1.

Like letters indicate like parts in all the figures.

The most usual mode of constructing stuffing-boxes, such as are used for piston or pump rods, trunnions, and various other parts of machinery in which leakage round a rod or shaft has to be provided against, is to connect the socket with the gland by standing bolts, arranged at equal distances or thereabouts, round the gland; but this description of stuffing-box is objectionable, inasmuch as to tighten down the gland straight in the socket requires the standing bolts or their nuts on opposite sides of the stuffing-box to be equally adjusted or screwed down, which is difficult to accomplish at all times, while, if the gland be not screwed down straight, it presses unequally on the packing, and is apt to bind or cut. To obviate this, the gland stem itself has had a screw thread cut upon it, and been made to fit or screw into a complete nut or socket, in the bottom of which is arranged the jute or other soft packing; but this construction has the objection of the packing fouling by getting into the screw thread of the gland or that of the socket; and the arrangement being a close one, there is no means, except by unscrewing the gland, of ascertaining or correcting the defect or seeing the precise condition of the gland.

To construct a stuffing-box free from these objections is the object of my invention, the nature of which consists in providing the gland, outside of the socket into which it fits, and which holds the packing, with a screw thread pitched to gear or mesh into a divided or open screw box or projection outside of the socket, and which divided projection may consist of lugs arranged opposite each other, and having a screw thread cut on their interior faces, whereby the objections incidental to the previously-described arrangements are avoided.

For the information of others whom it may concern I now proceed to describe my invention with reference to the accompanying drawing, in which—

A is the socket portion of a stuffing-box, B the packing, and C the gland, the hollow stem of which carries at its top, or outside of the socket, a head or other formation, $s$, of any suitable diameter, having cut upon it a screw thread which meshes into female threads on the inside faces of a divided or open projection formed, say by lugs D D, fast to the socket or other portion than the gland, so that by turning the gland in an appropriate direction, which may be done by a fork wrench, or in any other way, its screw formation $s$ will, by its gear with the lugs D D, that form an open or divided screw box, work the gland stem equally from opposite sides on the packing, without risk of the packing fouling the screw, and forming an open arrangement which exposes to view the gland stem and its union with the socket, whereby the amount of leakage and condition of the packing are readily ascertainable.

What I claim herein as new and useful, and desire to secure by Letters Patent, is—

The combination of the lugs D D, having threads on their inner faces, and forming an open or divided screw box, with the screw formation $s$ on the gland C, outside of the socket, for operation together, substantially as specified.

WM. HARSEN.

Witnesses:
A. LE CLERC,
J. W. COOMBS.